(12) United States Patent
Tada et al.

(10) Patent No.: US 11,821,870 B2
(45) Date of Patent: Nov. 21, 2023

(54) DEFECT MEASUREMENT DEVICE, DEFECT MEASUREMENT METHOD, AND INSPECTION PROBE

(71) Applicant: SUMITOMO CHEMICAL COMPANY, LIMITED, Tokyo (JP)

(72) Inventors: Toyokazu Tada, Niihama (JP); Hidehiko Suetsugu, Niihama (JP)

(73) Assignee: SUMITOMO CHEMICAL COMPANY, LIMITED, Tokyo (JP)

( * ) Notice: Subject to any disclaimer, the term of this patent is extended or adjusted under 35 U.S.C. 154(b) by 492 days.

(21) Appl. No.: 16/768,154

(22) PCT Filed: Dec. 3, 2018

(86) PCT No.: PCT/JP2018/044383
§ 371 (c)(1),
(2) Date: May 29, 2020

(87) PCT Pub. No.: WO2019/107575
PCT Pub. Date: Jun. 6, 2019

(65) Prior Publication Data
US 2020/0319141 A1    Oct. 8, 2020

(30) Foreign Application Priority Data
Dec. 1, 2017    (JP) .................... 2017-231988

(51) Int. Cl.
*G01N 27/82*    (2006.01)
(52) U.S. Cl.
CPC .................... *G01N 27/825* (2013.01)
(58) Field of Classification Search
CPC ....... G01N 27/825; G01N 27/83; G01N 27/82
See application file for complete search history.

(56) References Cited

U.S. PATENT DOCUMENTS

| | | | | |
|---|---|---|---|---|
| 2,992,390 A | * | 7/1961 | De Witte | G01N 27/9046 336/171 |
| 4,789,827 A | * | 12/1988 | Bergander | G01N 27/82 324/228 |
| 2003/0038829 A1 | | 2/2003 | Yokota et al. | |

(Continued)

FOREIGN PATENT DOCUMENTS

| EP | 0 266 103 B1 | 5/1994 |
|---|---|---|
| EP | 3 324 180 A1 | 5/2018 |

(Continued)

OTHER PUBLICATIONS

English translation of the International Search Report, dated Feb. 26, 2019, for International Application No. PCT/JP2018/044383.
International Preliminary Report on Patentability and English translation of the Written Opinion of the International Searching Authority, dated Jun. 11, 2020, for International Application No. PCT/JP2018/044383.

(Continued)

*Primary Examiner* — Robert J Eom
(74) *Attorney, Agent, or Firm* — Birch, Stewart, Kolasch & Birch, LLP (57) ABSTRACT

An inspection probe (100) includes a Hall element (3) which detects the density of magnetic flux flowing in a magnetic circuit formed by a yoke (1), a magnet (2), and a magnetic pipe (P). A second outer circumferential surface (12*a*) of the yoke (1) is arranged to be located closer to the magnetic pipe (P) than a first outer circumferential surface (11*a*) of the yoke (1) is to the magnetic pipe (P).

8 Claims, 7 Drawing Sheets

(56) References Cited

U.S. PATENT DOCUMENTS

| | | | |
|---|---|---|---|
| 2012/0007596 A1* | 1/2012 | Hashimoto | G01N 27/9006 324/240 |
| 2012/0253696 A1 | 10/2012 | Pearson et al. | |
| 2018/0202975 A1 | 7/2018 | Tada et al. | |
| 2018/0217097 A1 | 8/2018 | Tada et al. | |

FOREIGN PATENT DOCUMENTS

| | | |
|---|---|---|
| JP | 52-149184 A | 12/1977 |
| JP | 57-30943 A | 2/1982 |
| JP | 3-118465 A | 5/1991 |
| JP | 4-273055 A | 9/1992 |
| JP | 2002-195984 A | 7/2002 |
| JP | 2004-212161 A | 7/2004 |
| JP | 2017-26353 A | 2/2017 |
| JP | 2017-26354 A | 2/2017 |
| WO | WO 2017/010214 A1 | 1/2017 |

OTHER PUBLICATIONS

Extended European Search Report for European Application No. 18884801.4, dated Jul. 30, 2021.

Japanese Notification of Reasons for Refusal for Japanese Application No. 2017-231988, dated Aug. 31, 2021, with an English translation.

Saudi Arabian Office Action (including an English translation thereof) issued in the corresponding Saudi Arabian Patent Application No. 520412083 dated Sep. 26, 2022.

Korean Office Action for Korean Application No. 10-2020-7018366, dated Feb. 28, 2023, with English translation.

Chinese Office Action and Search Report (including an English translation thereof) issued in the corresponding Chinese Patent Application No. 201880077200.3 dated Feb. 2, 2023.

Chinese Office Action for Chinese Application No. 201880077200. 3, dated Jul. 29, 2023, with an English translation.

Saudi Office Action dated Sep. 3, 2023 for Application No. 520412083 with an English translation.

* cited by examiner

FIG. 9 understand# DEFECT MEASUREMENT DEVICE, DEFECT MEASUREMENT METHOD, AND INSPECTION PROBE

TECHNICAL FIELD

The present invention relates to a device and method for measuring a defect of a member made of a magnetic material, and an inspection probe for use in measurement of the defect.

BACKGROUND ART

As an inspection method for investigating the presence/absence of a defect (deficiency) in a magnetic member such as thinning and cracking, Magnetic Flux Leakage (MFL) and the like disclosed in Patent Literature 1 have been conventionally known. Paten Literature 2 discloses Magnetic Flux Resistance as an inspection method for quantitatively measuring a defect in a magnetic member.

CITATION LIST

Patent Literature

[Patent Literature 1]
Japanese Patent Application Publication Tokukai No. 2004-212161 (Publication date: Jul. 29, 2004)
[Patent Literature 2]
Japanese Patent Application Publication Tokukai No. 2017-026353 (Publication date: Feb. 2, 2017)

SUMMARY OF INVENTION

Technical Problem

However, an inspection probe is capable of having thereon a magnet of only a limited size. Therefore, if a small-diameter magnetic member or a thick magnetic member is subjected to measurement, the technique disclosed in Patent Literature 2 may not suffice in obtaining a magnetic flux density necessary for quantitative defect measurement using the Magnetic Flux Resistance, and quantitative measurement may be difficult.

An object of an aspect of the present invention is to provide a defect measuring device, a defect measuring method, and an inspection probe each of which is capable of quantitatively measuring a defect even in cases of a small-diameter magnetic member and a thick magnetic member.

Solution to Problem

In order to attain the above object, a defect measuring device in accordance with an aspect of the present invention is a defect measuring device for measuring a defect of a magnetic member so as to inspect the defect, the defect measuring device including: an inspection probe including a magnet, a yoke configured to be located on the opposite side of the magnet from the magnetic member, and a magnetic sensor which is configured to be located between the yoke and the magnetic member and which is configured to detect a density of magnetic flux flowing in a magnetic circuit, the magnetic circuit being formed by the magnet, the yoke, and the magnetic member; and a calculating section configured to calculate a depth of the defect of the magnetic member based on an output from the magnetic sensor, the yoke having a first counter surface and a second counter surface, the first counter surface being arranged to face the magnetic member with the magnet interposed between the first counter surface and the magnetic member, the second counter surface being arranged to face the magnetic member with the magnetic sensor interposed between the second counter surface and the magnetic member, the second counter surface being arranged to be located closer to the magnetic member than the first counter surface is to the magnetic member.

In order to attain the above object, a defect measuring method in accordance with an aspect of the present invention is a method of measuring a defect of a magnetic member so as to inspect the defect, including inspecting the defect of the magnetic member with use of the defect measuring device.

In order to attain the above object, an inspection probe in accordance with an aspect of the present invention is an inspection probe configured to inspect a defect of a magnetic member, the inspection probe including: a magnet; a yoke configured to be located on the opposite side of the magnet from the magnetic member; and a magnetic sensor which is configured to be located between the yoke and the magnetic member and which is configured to detect a density of magnetic flux flowing in a magnetic circuit, the magnetic circuit being formed by the magnet, the yoke, and the magnetic member, the yoke having a first counter surface and a second counter surface, the first counter surface being arranged to face the magnetic member with the magnet interposed between the first counter surface and the magnetic member, the second counter surface being arranged to face the magnetic member with the magnetic sensor interposed between the second counter surface and the magnetic member, the second counter surface being arranged to be located closer to the magnetic member than the first counter surface is to the magnetic member.

Advantageous Effects of Invention

An aspect of the present invention brings about an effect of making it possible to quantitatively measure a defect even in cases of a small-diameter magnetic member or a thick magnetic member.

BRIEF DESCRIPTION OF DRAWINGS

(a) and (b) of FIG. 4 are graphs showing a relationship between (i) an external magnetic field (magnetic field) H, (ii) a magnetic flux density B applied to a magnetic pipe located in the external magnetic field H, and (iii) a relative permeability μ of the magnetic pipe obtained from the relationship B-μH.

(a) of FIG. 5 schematically illustrates an example of a distribution of magnetic flux density during thinning measurement with use of a comparative inspection probe. (b) of FIG. 5 schematically illustrates an example of a distribution of magnetic flux density during thinning measurement with use of the inspection probe of FIG. 1.

(a) and (b) of FIG. 8 each schematically illustrate a configuration of an inspection probe in accordance with Embodiment 2 of the present invention.

DESCRIPTION OF EMBODIMENTS

A magnetic member to be inspected in the present invention is a member made of a magnetic material. Examples of the magnetic member include cables, wires, plate-like members, and various structures, each of which is made of a magnetic material. Examples of a defect of a magnetic member include thickness loss (hereinafter referred to as "thinning") and cracks. The thinning is a phenomenon in which the thickness of a member or the like is reduced by mechanical abrasion and/or chemical corrosion.

The following description will discuss an embodiment of the present invention. According to the present embodiment, thinning of a magnetic pipe, which serves as a magnetic member to be inspected, is inspected with use of a Hall element serving as a magnetic sensor. Note, however, that, in the present invention, a member to be inspected is not limited to a magnetic pipe, and content of the inspection is not limited to thinning.

According to the present embodiment, a depth of a defect in a direction in which a magnetic member and a magnet according to an embodiment of the present invention face each other will be referred to as "thinning depth". A calculating section, which determines the presence/absence of a defect and calculates the depth of the defect in the direction in which the magnetic member and the magnet face each other based on an output from a magnetic sensor in accordance with an embodiment of the present invention, will be referred to as "thinning depth calculating section". A defect measuring device in accordance with an embodiment of the present invention will be referred to as "thinning measuring device".

(1. Configuration of Inspection Probe)

Figure 1:
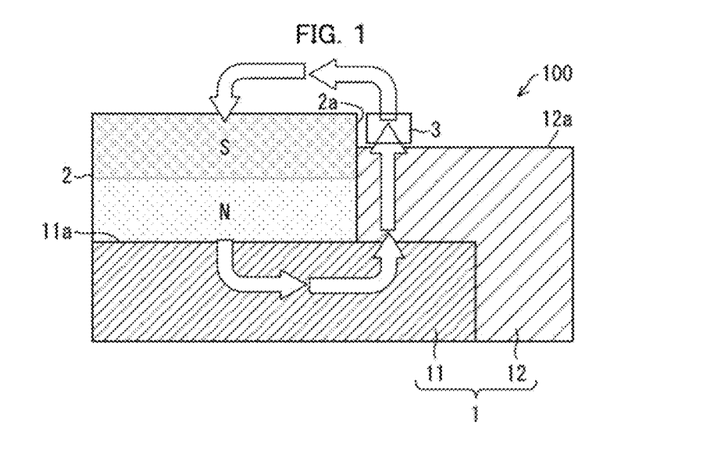
FIG. 1 schematically illustrates a configuration of an inspection probe for use in a thinning measuring device in accordance with Embodiment 1 of the present invention.

FIG. 1 schematically illustrates a configuration of an inspection probe 100 in accordance with the present embodiment. Note that, in this specification, a cross section of a configuration of the inspection probe, taken from a plane that passes through the central axis of a yoke, is illustrated for convenience of description.

According to the present embodiment, thinning of a magnetic pipe is inspected by the Magnetic Flux Resistance (MFR) (described later) through: inserting the inspection probe 100 into the magnetic pipe having a substantially cylindrical shape; and moving the inspection probe 100 in the magnetic pipe. Examples of the magnetic pipe to be inspected include pipes made of magnetic materials such as: carbon steel; ferritic stainless steel; and two-phase stainless steel having two phases which are a ferrite phase and an austenite phase.

As illustrated in FIG. 1, the inspection probe 100 includes a yoke 1, a magnet 2, and a Hall element 3. The yoke 1 includes a small-diameter yoke (small-diameter part) 11 and a large-diameter yoke (large-diameter part) 12. The small-diameter yoke 11 is a substantially cylindrical member made of a magnetic material, and has a first outer circumferential surface (first counter surface) 11a. The large-diameter yoke 12 is a substantially cylindrical member made of a magnetic material, and has a second outer circumferential surface (second counter surface) 12a. The large-diameter yoke 12 is larger in diameter than the small-diameter yoke 11. The large-diameter yoke 12 is provided coaxially with the small-diameter yoke 11. The large-diameter yoke 12 engages with an end of the small-diameter yoke 11, and is thereby joined (connected) to the small-diameter yoke 11. Therefore, the difference in outer diameter between the small-diameter yoke 11 and the large-diameter yoke 12 results in formation of a stepped portion extending along the circumference of the yoke 1. The first outer circumferential surface 11a is positioned lower than the stepped portion, and the second outer circumferential surface 12a is positioned higher than the stepped portion. The first outer circumferential surface 11a positioned lower than the stepped portion is provided with the magnet 2, and the second outer circumferential surface 12a positioned higher than the stepped portion is provided with the Hall element 3.

Examples of the magnetic material of which the yoke 1 is made include high permeability metals such as carbon steel and low alloy steel. Shapes of the small-diameter yoke 11 and the large-diameter yoke 12 are not particularly limited, and can each be, for example, a rod-like shape, a plate-like shape, a polygonal columnar shape, or a hollow cylindrical shape.

The magnet 2 is provided on the first outer circumferential surface 11a of the small-diameter yoke 11 along the stepped portion such that an end face (end) 2a of the magnet 2 faces the large-diameter yoke 12. The magnet 2 is, for example, in the form of an arc (or a ring). The magnet 2 is positioned so that, when the inspection probe 100 is inserted in the magnetic pipe, magnetic poles of the magnet 2 are in line with a radial direction of the magnetic pipe in a manner such that one of the magnetic poles faces the small-diameter yoke 11 and the other (opposite) of the magnetic poles faces the magnetic pipe. That is, the magnet 2 is polarized in a direction in which the magnet 2 faces the magnetic pipe. FIG. 1 shows an example in which the N pole and the S pole of the magnet 2 are positioned so as to face the yoke 1 and the magnetic pipe, respectively. However, the present invention is not limited to this example, and can be configured so that the S pole and the N pole are positioned so as to face the yoke 1 and the magnetic pipe, respectively.

An output voltage of the Hall element (magnetic sensor) 3 changes with changes in density of magnetic flux passing through the Hall element 3. As indicated by arrows in FIG. 1, the yoke 1 and the magnet 2 form a magnetic circuit. The Hall element 3 is provided on the magnetic circuit. FIG. 1 shows an example in which the Hall element 3 is provided on the second outer circumferential surface 12a of the large-diameter yoke 12 in a place near the end face 2a of the magnet 2 (the end face 2a is one of the opposite end faces of the magnet 2 in the axial direction of the magnetic pipe). The Hall element 3 is provided on the magnetic circuit and oriented such that its output voltage decreases as the density of magnetic flux passing therethrough increases, i.e., oriented such that its negative output voltage increases in absolute value as the density of magnetic flux passing therethrough increases.

(2. Overview of Magnetic Flux Resistance)

Figure 2:
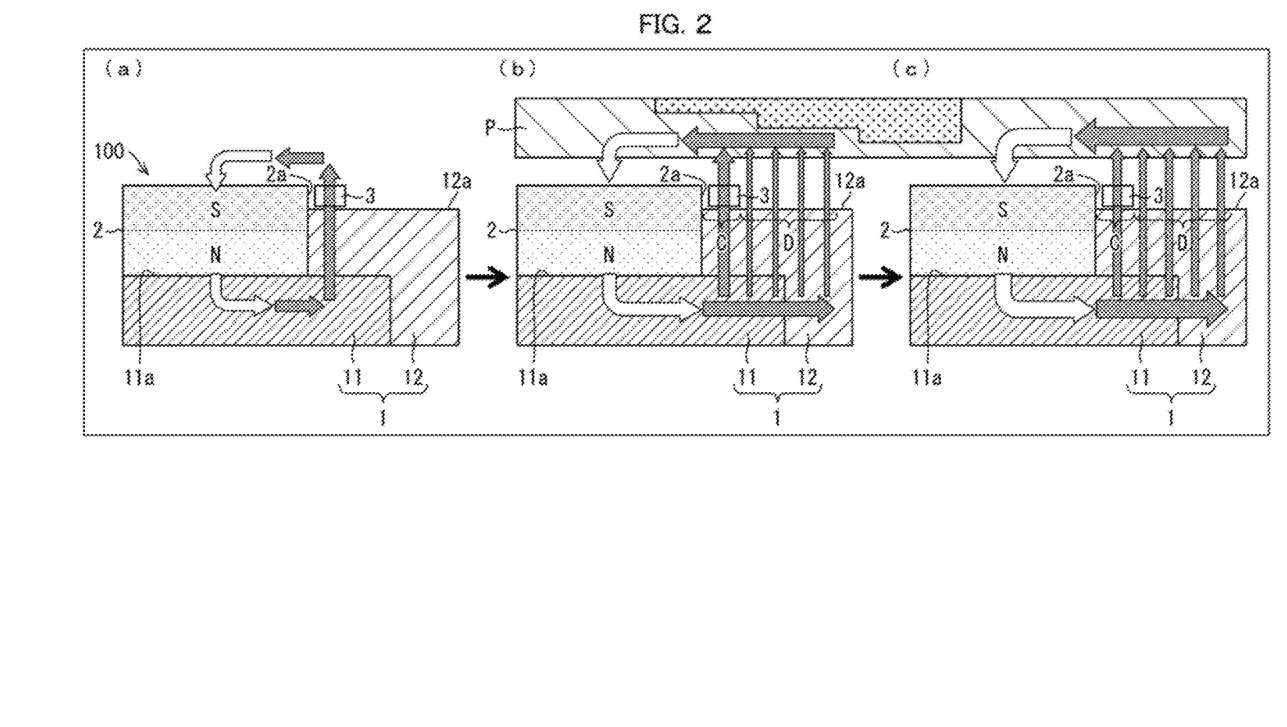
FIG. 2 schematically illustrates states of the inspection probe of FIG. 1 during measurement of thinning.

FIG. 2 schematically illustrates the inspection probe 100 during measurement of thinning of a magnetic pipe P. (a) of FIG. 2 illustrates the inspection probe 100 in mid-air, (b) of FIG. 2 illustrates a case where there is thinning of the magnetic pipe P, and (c) of FIG. 2 illustrates a case where there is no thinning of the magnetic pipe P. When the inspection probe 100 in accordance with the present embodiment is inserted into the magnetic pipe P, a magnetic circuit is formed by (i) the yoke 1 and the magnet 2 of the inspection probe 100 and (ii) the magnetic pipe P.

As illustrated in (a) of FIG. 2, when the inspection probe 100 is in mid-air, that is, when the magnetic pipe P to be inspected is not present in the magnetic circuit, a magnetic resistance in the magnetic circuit is large. Therefore, the density of magnetic flux flowing through the entire magnetic circuit is small.

When, as illustrated in (b) of FIG. 2, the magnetic pipe P to be inspected is present in the magnetic circuit, the magnetic resistance in the magnetic circuit is smaller than when the inspection probe 100 is in mid-air (as illustrated in (a) of FIG. 2). Therefore, the density of magnetic flux flowing through the entire magnetic circuit is larger than when in the state illustrated in (a) of FIG. 2. On the contrary, because there is thinning, the magnetic resistance in the magnetic circuit in (b) of FIG. 2 is larger than when there is no thinning of the magnetic pipe P (as illustrated in (c) of FIG. 2). Therefore, the density of magnetic flux flowing through the entire magnetic circuit is smaller than when in the state illustrated in (c) of FIG. 2.

When the magnetic pipe P has not been thinned (in the case of an intact portion) as illustrated in (c) of FIG. 2, the magnetic resistance in the magnetic circuit is smaller than when the magnetic pipe P has been thinned (as illustrated in (b) of FIG. 2). Therefore, the density of magnetic flux flowing through the entire magnetic circuit is larger than when in the state as illustrated in (b) of FIG. 2.

As illustrated in (b) and (c) of FIG. 2, when the inspection probe 100 is inserted in the magnetic pipe P, the first outer circumferential surface 11a of the small-diameter yoke 11 faces the magnetic pipe P with the magnet 2 interposed between the first outer circumferential surface 11a and the magnetic pipe P, and is substantially parallel to the interior surface of the magnetic pipe P. The second outer circumferential surface 12a of the large-diameter yoke 12 faces the magnetic pipe P with the Hall element 3 interposed between the second outer circumferential surface 12a and the magnetic pipe P, and is substantially parallel to the interior surface of the magnetic pipe P. The small-diameter yoke 11 and the large-diameter yoke 12 are connected together along the axial direction of the magnetic pipe P, and, as described earlier, the large-diameter yoke 12 is larger in diameter than the small-diameter yoke 11; therefore, the second outer circumferential surface 12a is located closer to the magnetic pipe P than the first outer circumferential surface 11a is to the magnetic pipe P.

Note here that, when the inspection probe 100 is inserted in the magnetic pipe P, magnetic flux is generated between the large-diameter yoke 12 and the magnetic pipe P which face each other with the Hall element 3 between them. That is, magnetic flux bridging the second outer circumferential surface 12a and the interior surface of the magnetic pipe P is generated. This magnetic flux, in position C (which is an area within a predetermined distance from the end face 2a of the magnet 2), changes in a manner such that the density of magnetic flux passing through the position C decreases as the density of magnetic flux flowing through the entire magnetic circuit increases (i.e., as the thinning depth of the magnetic pipe P decreases). On the contrary, the magnetic flux, in position D (which is an area distant from the end face 2a of the magnet 2 by greater than the predetermined distance), changes in a manner such that the density of magnetic flux passing through the position D increases as the density of magnetic flux flowing through the entire magnetic circuit increases (i.e., as the thinning depth of the magnetic pipe P decreases).

The density of magnetic flux passing through the position C (which is an area within a predetermined distance from the end face 2a of the magnet 2) is greater than the density of magnetic flux passing through the position D, and changes more greatly in response to changes in the thinning depth of the magnetic pipe P than the density of magnetic flux passing through the position D. Therefore, the inspection probe 100 is arranged such that: the Hall element 3 is located in the position C which is an area within a predetermined distance from the end face 2a of the magnet 2; the output voltage of the Hall element 3 is measured; and thereby whether there is thinning of the magnetic pipe P or not is determined and the wall thickness and thinning depth of the magnetic pipe P are calculated. This makes it possible to suitably determine whether or not there is thinning of the magnetic pipe P and to suitably measure the wall thickness and thinning depth of the magnetic pipe P.

Note that the wall thickness of the magnetic pipe P in the present embodiment is a wall thickness of the magnetic pipe P in a direction in which the magnetic pipe P and the magnet 2 face each other.

Figure 3:
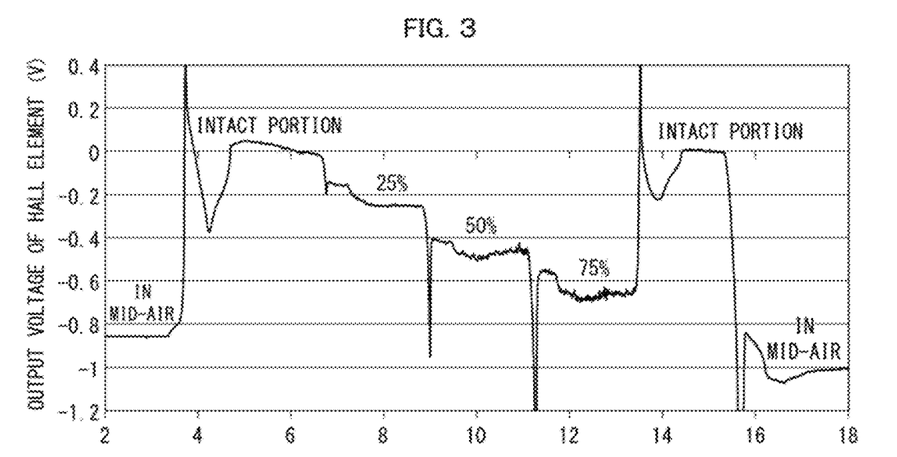
FIG. 3 is a graph showing a relationship between (i) a voltage outputted from a Hall element included in the inspection probe of FIG. 1 and (ii) a thinning rate of a magnetic pipe.

FIG. 3 is a graph showing a relationship between a voltage outputted from the Hall element 3 and a thinning rate of the magnetic pipe P. In FIG. 3, the voltage outputted from the Hall element 3 when the magnetic pipe P has not been thinned and is intact is 0 V.

As described earlier, the Hall element 3 is provided on the magnetic circuit and oriented such that its output voltage decreases as the density of magnetic flux passing therethrough increases, i.e., oriented such that its negative output voltage increases in absolute value as the density of magnetic flux passing therethrough increases.

As shown in FIG. 3, when the inspection probe 100 is in mid-air, the density of magnetic flux passing through the Hall element 3 located in the position C is large. This causes the value of the output voltage of the Hall element 3 to be small (causes the absolute value of negative output voltage to be large). In contrast, when the inspection probe 100 is located in the magnetic pipe P and there is no thinning of the magnetic pipe P, the density of magnetic flux passing through the Hall element 3 located in the position C is small. This causes the value of the output voltage of the Hall element 3 to be large (causes the absolute value of negative output voltage to be small). When there is thinning of the magnetic pipe P, the Hall element 3 outputs a voltage corresponding to the thinning rate. For example, for thinning of the magnetic pipe P at thinning rates of 25%, 50%, and 75%, the density of magnetic flux passing through the Hall element 3 located in the position C increases stepwise accordingly. Thus, the values of the voltage outputted from the Hall element 3 correspond to the respective thinning rates and decrease stepwise (the absolute value of negative output voltage increases stepwise).

Note that "thinning rate" according to the present embodiment is the ratio of the lost wall thickness in the direction in which the magnetic pipe P and the magnet 2 face each other to the wall thickness of the magnetic pipe P in an intact state. For example, if the thinning rate of a magnetic pipe P is 75%, the wall thickness of the magnetic pipe P is ¼ of that of the magnetic pipe P which is in an intact state.

Figure 4:
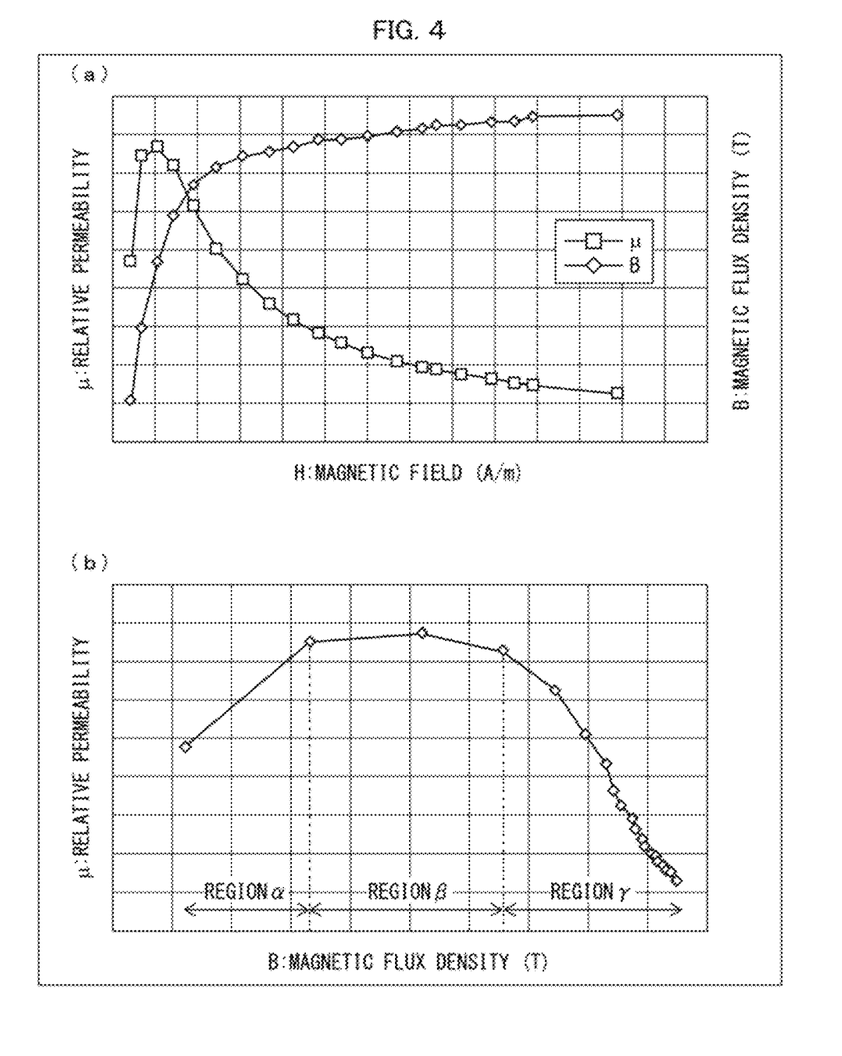

FIG. 4 shows charts showing a relationship between (i) an external magnetic field (magnetic field) H, (ii) a magnetic flux density B applied to a magnetic pipe P located in the external magnetic field H, and (iii) a relative permeability μ of the magnetic pipe P obtained from the relationship B-μH. (a) of FIG. 4 illustrates the relationship where the horizontal axis shows the external magnetic field H and the vertical axes show the relative permeability μ and the magnetic flux density B. (b) of FIG. 4 shows the relationship where the horizontal axis shows the magnetic flux density B and the vertical axis shows the relative permeability μ.

As illustrated in (b) of FIG. 4, a region where the magnetic flux density B is small (region α in (b) of FIG. 4) is a region where magnetic noise occurs and therefore the relative permeability μ is unstable. A region where the magnetic flux density B is at a moderate level (region β in (b) of FIG. 4) is a region which is unsuitable for measurement of a thinning rate of the magnetic pipe P with use of the Hall element 3 because, in the region, although magnetic noise is suppressed, a variance in the relative permeability μ is small despite an increase in the magnetic flux density B.

In contrast, a region where the magnetic flux density is large (region γ in (b) of FIG. 4) is a region which is suitable for measurement of the thinning rate of the magnetic pipe P because, in the region, an increase in the magnetic flux density B is directly proportional to a monotonic decrease in the relative permeability. In particular, in a region where the magnetic flux density B is large approximately to an extent at which the magnetic pipe P does not completely reach magnetic saturation, an increase in the magnetic flux density B is directly proportional to a linear decrease in the relative permeability μ. Therefore, if the thinning rate of the magnetic pipe P is measured with use of the inspection probe 100 which is configured so that the magnetic flux density B in this region γ is applied to the magnetic pipe P, there is a linear relationship between the thinning rate of the magnetic pipe P and the output voltage of the Hall element 3. Hence, the magnet 2 to be used for the inspection probe 100 is preferably a high-performance magnet which generates a strong magnetic field. Examples of the high-performance magnet encompass rare earth magnets such as neodymium magnet.

Note, here, that only a magnet of limited size can be disposed on an inspection probe. Therefore, according to conventional inspection probes, if a small-diameter or thick-wall magnetic pipe P is subjected to measurement, the magnetic flux density B in the region γ shown in (b) of FIG. 4, which is necessary to quantitatively measure defects using the Magnetic Flux Resistance, is not obtained, resulting in the possibility that quantitative measurement becomes difficult.

In view of such circumstances, the inspection probe 100 in accordance with the present embodiment employs an arrangement in which (i) the yoke 1 includes the large-diameter yoke 12 which is larger in outer diameter than the small-diameter yoke 11 and (ii) the space between the yoke 1 (large-diameter yoke 12) and the magnetic pipe P, facing each other with the Hall element 3 interposed between them, is small. With this, the inspection probe 100 in accordance with the present embodiment achieves a desired magnetic flux density B.

Figure 5:
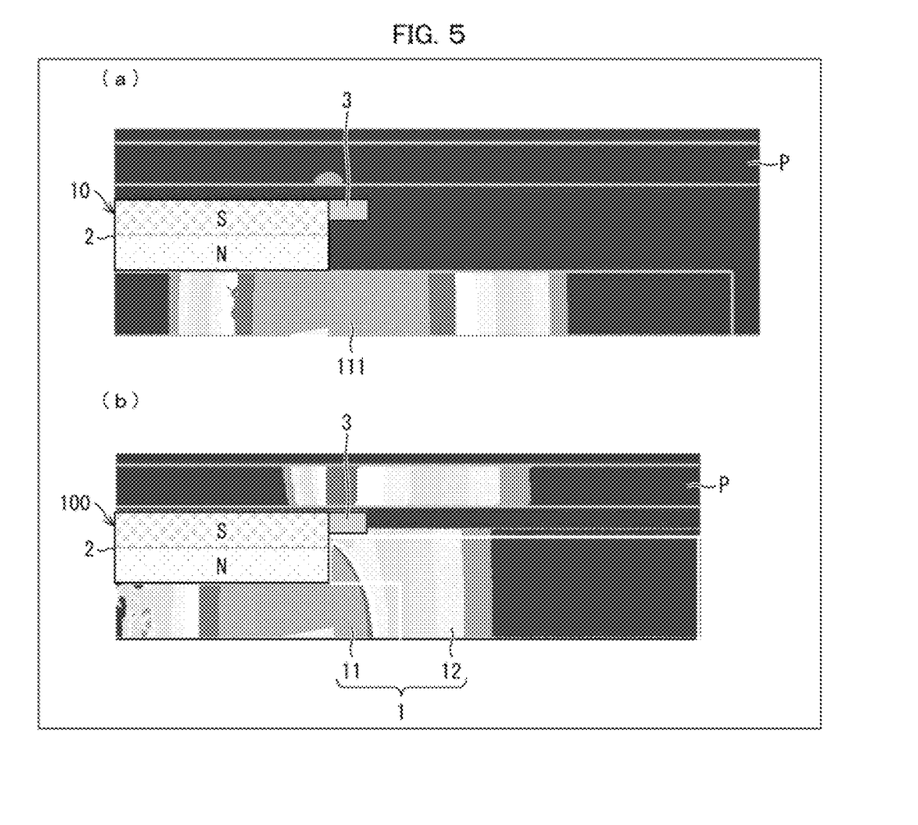

(a) of FIG. 5 schematically illustrates an example of a distribution of magnetic flux density during thinning measurement with use of a comparative inspection probe 10. (b) of FIG. 5 schematically illustrates an example of a distribution of magnetic flux density during thinning measurement with use of the inspection probe 100 in accordance with the present embodiment.

As illustrated in (a) of FIG. 5, the comparative inspection probe 10 only includes a small-diameter yoke 111 substantially in the form of a cylinder, and does not include the large-diameter yoke 12. With regard to the comparative inspection probe 10 including no large-diameter yoke 12, the space between the small-diameter yoke 111 and the magnetic pipe P facing each other with the Hall element 3 interposed between them is large. Therefore, in the magnetic pipe P, the magnetic flux density B in the region γ shown in (b) of FIG. 4 cannot be achieved. In contrast, as illustrated in (b) of FIG. 5, according to the inspection probe 100 including the large-diameter yoke 12, the space between the large-diameter yoke 12 and the magnetic pipe P facing each other with the Hall element 3 interposed between them is small. Therefore, in the magnetic pipe P, the magnetic flux density B in the region γ shown in (b) of FIG. 4 can be achieved suitably.

As such, according to the inspection probe 100 in which the yoke 1 includes the large-diameter yoke 12, it is possible to achieve a desired magnetic flux density B without having to change the size of the magnet 2. The inspection probe 100 thus makes it possible to quantitatively measure a defect in a small-diameter or thick-wall magnetic pipe P.

Figure 6:
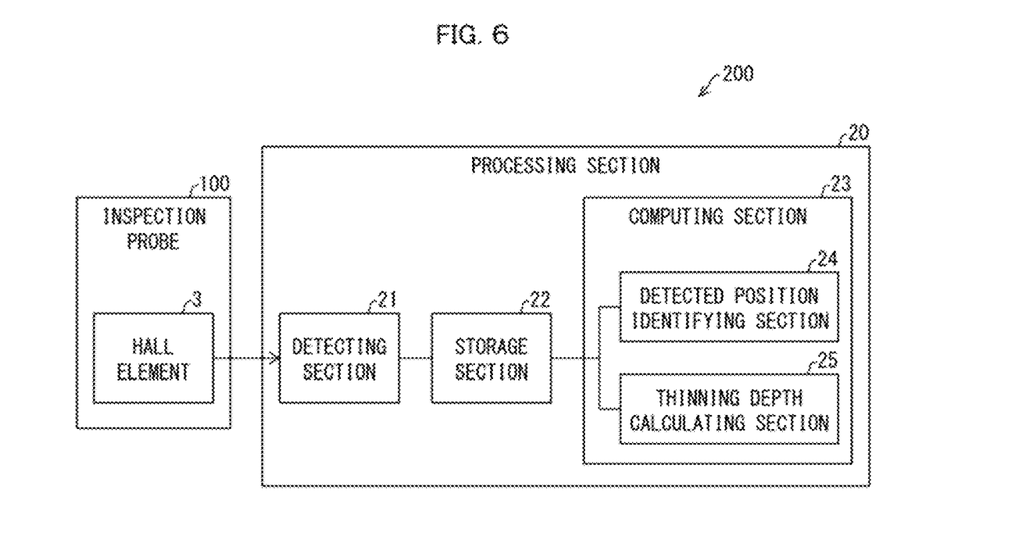
FIG. 6 is a block diagram illustrating a configuration of a processing section which is included in the thinning measuring device in accordance with Embodiment 1 of the present invention.

(3. Configuration of Processing Section) FIG. 6 is a block diagram illustrating a configuration of a processing section 20 which is included in a thinning measuring device 200 in accordance with the present embodiment. Note that the thinning measuring device 200 in accordance with the present embodiment includes the inspection probe 100 and the processing section 20.

The thinning measuring device 200 in accordance with the present embodiment is configured so that the processing section 20 quantitatively evaluates thinning of a magnetic pipe P with use of the Magnetic Flux Resistance according to an output voltage of the Hall element 3 included in the inspection probe 100.

As illustrated in FIG. 6, the processing section 20 includes a detecting section 21, a storage section 22, and a computing section 23. The computing section 23 includes a detected position identifying section 24 and a thinning depth calculating section 25.

The detecting section 21 obtains an output voltage value of a Hall element 3, and then controls the storage section 22 to store the output voltage value and a detected time (point in time at which the voltage value was detected) such that the output voltage value and the detected time are associated with each other.

A configuration of the storage section 22 is not particularly limited. Examples of the storage section 22 encompass storage media such as (i) tapes such as a magnetic tape and a cassette tape, (ii) disks including magnetic disks such as a floppy disk (Registered Trademark) and a hard disk and optical disks such as a CD-ROM, an MO, an MD, a DVD, and a CD-R, (iii) cards such as an IC card (including a memory card) and an optical card, and (iv) semiconductor memories such as a mask ROM, an EPROM, an EEPROM (Registered Trademark), and a flash ROM. The storage section 22 also stores a relational formula that indicates a relationship between an output voltage of the Hall element 3 and a thinning depth of a magnetic pipe, which relationship is calculated in advance with use of magnetic pipes for calibration. A method of finding the relational formula is not particularly limited, and a publicly known method can be used. For example, the relational formula can be found by associating actually measured thinning depths of the magnetic pipes for calibration with the outputs of the Hall element 3.

Based on the output voltage value of the Hall element 3 and a corresponding detected time which are stored in the storage section 22, the detected position identifying section 24 identifies a detected position in the magnetic pipe P which detected position corresponds to the output voltage value of the Hall element 3.

The thinning depth calculating section 25 determines the presence/absence of thinning and calculates a thinning depth of the magnetic pipe P, based on the output voltage of the Hall element 3 and the relational formula indicative of the relationship between an output voltage of the Hall element 3 and a thinning depth of the magnetic pipe P, which output voltage and the relational formula are stored in the storage section 22.

Note that the computing section 23 can be an integrated circuit (hardware logic) such as an ASIC (application specific integrated circuit), or can be realized by a computer executing software, which computer includes a processor such as a CPU. Alternatively, the computing section 23 can be realized by a combination of such an integrated circuit and software execution of such a computer.

Furthermore, the computing section 23 can be included in a housing in which the detecting section 21 and the storage section 22 are included, or can be included separately from the detecting section 21 and the storage section 22. In the latter case, the computing section 23 (i) obtains information, which is stored in the storage section 22, via, for example, wired communications, wireless communications, or a storage medium which can be attached and detached and then (ii) carries out a computing process.

(4. Process of Measuring Thinning)

Figure 7:
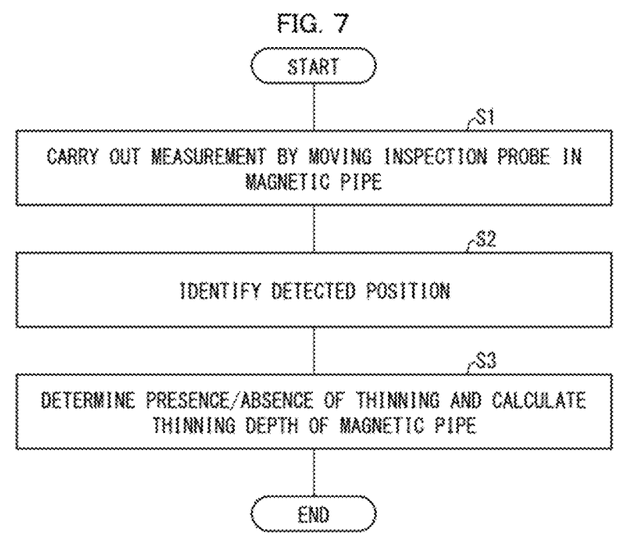
FIG. 7 is a flow chart illustrating a flow of a process carried out by the thinning measuring device in accordance with Embodiment 1 of the present invention.

FIG. 7 is a flow chart illustrating a flow of a process of measuring thinning according to the present embodiment. As shown in FIG. 7, first, the inspection probe 100 is inserted into a magnetic pipe P to be inspected, and measurement is carried out by the Hall element 3 while the inspection probe 100 is being moved axially in the magnetic pipe P (S1).

Next, based on information stored in the storage section 22, the detected position identifying section 24 identifies a detected position (position along the axial direction of the magnetic pipe P) corresponding to an output voltage value of the Hall element 3 (S2).

Next, the thinning depth calculating section 25 determines the presence/absence of thinning and calculates the thinning depth of the magnetic pipe P, based on the output voltage of the Hall element 3 and the relational formula indicative of the relationship between an output voltage of the Hall element 3 and a thinning depth of the magnetic pipe P, which output voltage and the relational formula are stored in the storage section 22 (S3). Then, the thinning depth calculating section 25 associates the calculated thinning depth with the detected position identified by the detected position identifying section 24, and the process of measuring thinning ends.

(5. Variations)

According to the present embodiment, the Hall element 3 is used as a magnetic sensor for detecting magnetic flux which flows in a magnetic circuit. Note, however, that the magnetic sensor can be any of various magnetic sensors capable of detecting a change in density of magnetic flux flowing in a magnetic circuit.

According to the present embodiment, the inspection probe 100 includes a single Hall element 3. However, the number of Hall elements 3 is not limited to one. Alternatively, the inspection probe 100 can include a plurality of Hall elements 3. If the inspection probe 100 includes a plurality of Hall elements 3, for example, a plurality of magnets 2 each in the form of an arc are provided at regular intervals along the outer circumference of the yoke 1. By thus configuring the inspection probe 100, it is possible to obtain an output voltage from each of the plurality of Hall elements 3. Therefore, it is possible to detect thinning and evaluate a thinning rate even if the thinned area is so small and local that magnetic flux can detour that area and flow through the surrounding intact area.

According to the present embodiment, the inspection probe 100 is inserted into the magnetic pipe P to be inspected and a measuring process is carried out by the Hall element 3 while the inspection probe 100 is being moved axially in the magnetic pipe P, and thereby the determination of the presence/absence of thinning and the calculation of a thinning depth are carried out. However, if the presence/absence of thinning and the calculation of the thinning depth are carried out at a single point of a magnetic pipe P to be inspected, it is unnecessary to move the inspection probe 100. That is, determination of the presence/absence of thinning and measurement of a thinning depth at a certain position of the magnetic pipe P may be carried out by (i) inserting the inspection probe 100 into the magnetic pipe P to be inspected and (ii) measuring an output of the Hall element 3 at that position.

According to the present embodiment, the yoke 1 is configured to be capable of being separated into the small-diameter yoke 11 and the large-diameter yoke 12. Note, however, that this does not imply any limitation. The small-diameter yoke 11 and the large-diameter yoke 12 can be integrally configured.

According to the present embodiment, the thinning measuring device 200 includes the detected position identifying section 24. Note, however, that the detected position identifying section 24 can be omitted. If the thinning measuring device 200 includes no detected position identifying section 24, the following arrangement may be employed, for example: the thinning depth calculating section 25 calculates thinning depths in the entire range of the magnetic pipe P to be evaluated; and a detected position is identified based on the result of the calculation.

Embodiment 2

The following description will discuss another embodiment of the present invention. For convenience of description, members having functions identical to those described in the foregoing embodiment are assigned identical referential numerals, and their descriptions are not repeated.

(1. Configuration of Inspection Probe)

Figure 8:
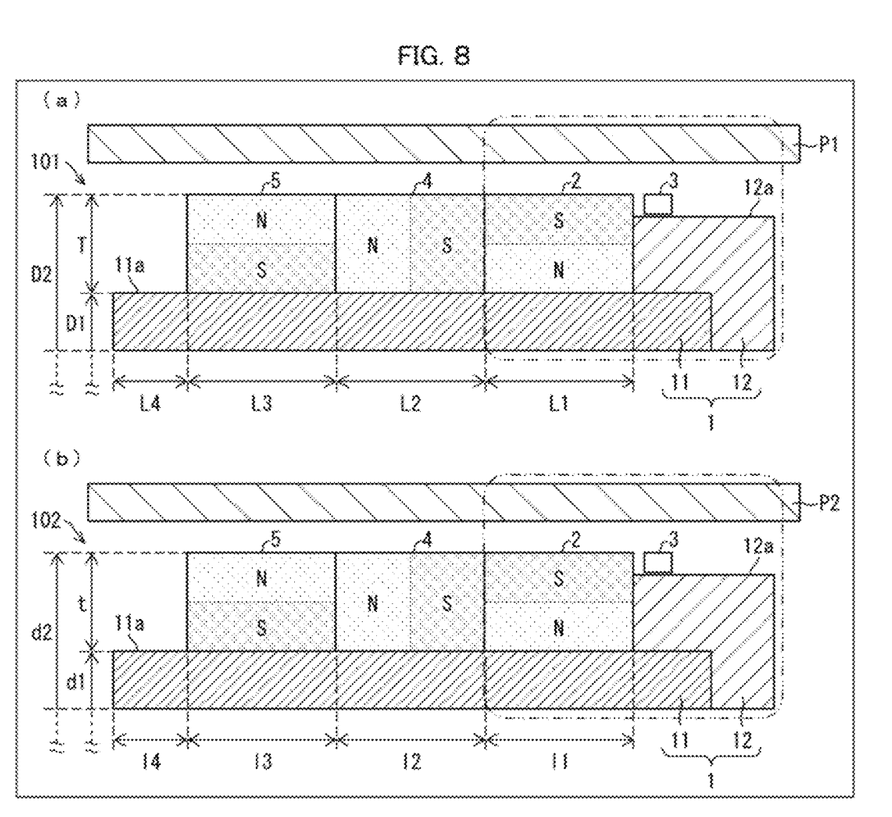

(a) of FIG. 8 schematically illustrates a configuration of an inspection probe 101 in accordance with Embodiment 2. (b) of FIG. 8 schematically illustrates a configuration of an inspection probe 102 in accordance with Embodiment 2.

In Embodiment 2, two inspection probes having different sizes, i.e., the inspection probe 101 and the inspection probe 102, were prepared and the output voltage of the Hall element 3 was measured, and thereby the most preferred range of each parameter was found.

As illustrated in (a) of FIG. 8, the inspection probe 101 is a probe for use in measurement of thinning of a magnetic pipe P1 which is made of carbon steel and which is 19 mm in outer diameter and 2.0 mm in wall thickness. As illustrated in (b) of FIG. 8, the inspection probe 102 is a probe for use in measurement of thinning of a magnetic pipe P2 which is 25.4 mm in outer diameter and 3.4 mm in wall thickness. The inspection probe 101 is designed to have a smaller outer diameter than that of the inspection probe 102 so that the inspection probe 101 can be inserted into the magnetic pipe P1 that is smaller in diameter than the magnetic pipe P2.

The inspection probe 101 and the inspection probe 102 each include a yoke 1 that includes a small-diameter yoke 11 and a large-diameter yoke 12. In Embodiment 2, the small-diameter yoke 11 and the large-diameter yoke 12 are each made of ELCH2S (pure iron-based soft magnetic material).

The small-diameter yoke 11 has a first outer circumferential surface 11a, on which three magnets each in the form of an arc (or a ring), i.e., a magnet 2, a magnet 4, and a magnet 5, are disposed. The magnet 2, the magnet 4, and the magnet 5 are each made of 50M, and are arranged in this order in the direction going away from the large-diameter yoke 12. The magnet 2 and the magnet 5 are each polarized in a direction in which the magnet 2 or the magnet 5 faces the magnetic pipe P. The magnet 4 is polarized in the axial direction of the magnetic pipe P. The large-diameter yoke has a second outer circumferential surface 12a, on which a Hall element 3 is disposed.

The following are examples of the size of each of the elements included in the inspection probe 101 and the inspection probe 102.

(Inspection Probe 101)

Hall element 3: 2 mm in length×2 mm in width×1 mm in thickness.

Small-diameter yoke 11: Outer diameter (D1) is 6 mm, length of projecting portion (L4) is 30 mm.

Magnet 2: Outer diameter (D2) is 14 mm, length (L1) is 40 mm, thickness (T) is 4 mm.

Magnet 4: Outer diameter (D2) is 14 mm, length (L2) is 40 mm, thickness (T) is 4 mm.

Magnet 5: Outer diameter (D2) is 14 mm, length (L3) is 40 mm, thickness (T) is 4 mm.

(Inspection Probe 102)

Hall element 3: 2 mm in length×2 mm in width×1 mm in thickness.

Small-diameter yoke 11: Outer diameter (d1) is 9.6 mm, length of projecting portion (14) is 30 mm.

Magnet 2: Outer diameter (d2) is 17.6 mm, length (l1) is 40 mm, thickness (t) is 4 mm.

Magnet 4: Outer diameter (d2) is 17.6 mm, length (l2) is 40 mm, thickness (t) is 4 mm.

Magnet 5: Outer diameter (d2) is 17.6 mm, length (l3) is 40 mm, thickness (t) is 4 mm.

(2. Evaluation Method)

Figure 9:
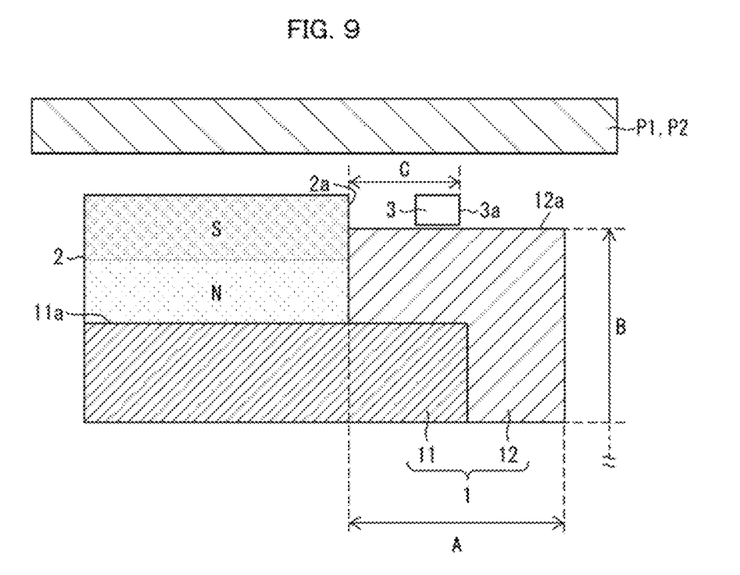
FIG. 9 is an enlarged view of an area, enclosed by dot-dot-dash line, of each of the inspection probes shown in (a) and (b) of FIG. 8.

FIG. 9 is an enlarged view of an area, enclosed by dot-dot-dash line, of each of the inspection probes 101 and 102 shown in (a) and (b) of FIG. 8. In Embodiment 2, the most preferred ranges of the following parameters (illustrated in FIG. 9) were found: length A (dimension in the axial direction of magnetic pipe) of the large-diameter yoke 12 of each of the inspection probes 101 and 102; outer diameter B of the large-diameter yoke 12 of each of the inspection probes 101 and 102; and the distance between position C of the end face (end) 3a of the Hall element 3 and the end face 2a of the magnet 2.

In Embodiment 2, the voltage outputted from the Hall element 3 when the inspection probe 101 was inserted in the magnetic pipe P1 and moved axially in the magnetic pipe P1 was measured. Also, the voltage outputted from the Hall element 3 when the inspection probe 102 was inserted in the magnetic pipe P2 and moved axially in the magnetic pipe P2 was measured.

Then, if the output voltage of the Hall element 3 was negative over the entire range (0 to 100%) of cross section deficiency ratio (thinning depth), such cases were ranked as "Good". If the output voltage of the Hall element 3 was negative in some portion of the whole range (0 to 100%) of cross section deficiency ratio and was positive in another portion of that range, such cases were ranked as "Fair".

(3. Evaluation Results)

TABLE 1A

| | | Length of large-diameter yoke (mm) | | | | |
|---|---|---|---|---|---|---|
| | | 6 | 8 | 10 | 20 | 30 |
| Outer diameter of magnetic pipe (mm) | 19.0 | Fair | Good | Good | Good | Good |

TABLE 1B

| | | Length of large-diameter yoke (mm) | | | |
|---|---|---|---|---|---|
| | | 8 | 10 | 20 | 30 |
| Outer diameter of magnetic pipe (mm) | 25.4 | Fair | Good | Good | Good |

The results of evaluation by the foregoing evaluation method with varying outer diameters of the magnetic pipe and varying lengths A of the large-diameter yoke 12 are shown in Table 1A and Table 1B. As a result of the measurement, it was found that, when the length A of the large-diameter yoke 12 is not less than 0.25 times and less than 0.35 times the outer diameter of the magnetic pipe, the output voltage of the Hall element 3 is negative in some portion of the whole range (0 to 100%) of cross section deficiency ratio and is positive in another portion of that range. It was also found that, when the length A of the large-diameter yoke 12 is not less than 0.35 times the outer diameter of the magnetic pipe, the output voltage of the Hall element 3 is negative over the entire range (0 to 100%) of cross section deficiency ratio.

As such, the length A of the large-diameter yoke 12 is preferably not less than 0.25 times the outer diameter of the magnetic pipe, more preferably not less than 0.35 times the outer diameter of the magnetic pipe.

TABLE 2A

| | | Outer diameter of large-diameter yoke (mm) | | | | |
|---|---|---|---|---|---|---|
| | | 10 | 11 | 12 | 13 | 14 |
| Outer diameter of magnetic pipe (mm) | 19.0 | Fair | Good | Good | Good | Good |

TABLE 2B

| | | Outer diameter of large-diameter yoke (mm) | | | | | |
|---|---|---|---|---|---|---|---|
| | | 12.6 | 13.6 | 14.6 | 15.6 | 16.6 | 17.6 |
| Outer diameter of magnetic pipe (mm) | 25.4 | Fair | Good | Good | Good | Good | Good |

The results of evaluation by the foregoing evaluation method with varying outer diameters of the magnetic pipe and varying outer diameters B of the large-diameter yoke 12 are shown in Table 2A and Table 2B. As a result of the measurement, it was found that, when the outer diameter B of the large-diameter yoke 12 is not less than 0.51 times and less than 0.55 times the outer diameter of the magnetic pipe, the output voltage of the Hall element 3 is negative in some portion of the whole range (0 to 100%) of cross section deficiency ratio and is positive in another portion of that range. It was also found that, when the outer diameter B of the large-diameter yoke 12 is not less than 0.55 times the outer diameter of the magnetic pipe, the output voltage of the Hall element 3 is negative over the entire range (0 to 100%) of cross section deficiency ratio.

As such, the outer diameter B of the large-diameter yoke 12 is preferably not less than 0.51 times the outer diameter of the magnetic pipe, more preferably not less than 0.55 times the outer diameter of the magnetic pipe.

TABLE 3

| | | Distance between end face of Hall element and end face of magnet (mm) | | | | |
|---|---|---|---|---|---|---|
| | | 1 | 2 | 3 | 4 | 5 |
| Outer diameter of magnetic pipe (mm) | 19.0 | Good | Good | Fair | Fair | Fair |
| | 25.4 | Good | Good | Fair | Fair | Fair |

The results of evaluation by the foregoing evaluation method with varying outer diameters of the magnetic pipe and varying positions C of the end face 3a of the Hall element 3 are shown in Table 3. As a result of the measurement, it was found that, when the position C of the end face 3a of the Hall element 3 is distant from the end face 2a of the magnet 2 by a distance more than 2.5 mm and not more than 5.5 mm, the output voltage of the Hall element 3 is negative in some portion of the whole range (0 to 100%) of cross section deficiency ratio and is positive in another portion of that range. It was also found that, when the position C of the end face 3a of the Hall element 3 is distant from the end face 2a of the magnet 2 by a distance not more than 2.5 mm, the output voltage of the Hall element 3 is negative over the entire range (0 to 100%) of cross section deficiency ratio.

As such, it is preferable that the position C of the end face 3a of the Hall element 3 is distant from the end face 2a of the magnet 2 by a distance of preferably not more than 5.5 mm, more preferably not more than 2.5, irrespective of the outer diameter of the magnetic pipe.

The present invention is not limited to the embodiments, but can be altered by a skilled person in the art within the scope of the claims. The present invention also encompasses, in its technical scope, any embodiment derived by combining technical means disclosed in differing embodiments.

Aspects of the present invention can also be expressed as follows.

A defect measuring device in accordance with an aspect of the present invention is a defect measuring device for measuring a defect of a magnetic member so as to inspect the defect, the defect measuring device including: an inspection probe including a magnet, a yoke configured to be located on the opposite side of the magnet from the magnetic member, and a magnetic sensor which is configured to be located between the yoke and the magnetic member and which is configured to detect a density of magnetic flux flowing in a magnetic circuit, the magnetic circuit being formed by the magnet, the yoke, and the magnetic member; and a calculating section configured to calculate a depth of the defect of the magnetic member based on an output from the magnetic sensor, the yoke having a first counter surface and a second counter surface, the first counter surface being arranged to face the magnetic member with the magnet interposed between the first counter surface and the magnetic member, the second counter surface being arranged to face the magnetic member with the magnetic sensor interposed between the second counter surface and the magnetic member, the second counter surface being arranged to be located closer to the magnetic member than the first counter surface is to the magnetic member.

According to the above configuration, the second counter surface is located closer to the magnetic member than the first counter surface is to the magnetic member. Therefore, the space between the magnetic member and the yoke, which face each other with the magnetic sensor interposed between them, is relatively small. This causes an increase in density of magnetic flux flowing in the magnetic circuit, making it possible to obtain a magnetic flux density that is necessary to measure a defect by the Magnetic Flux Resistance, without having to change the size of the magnet. As such, the above configuration achieves a defect measuring device that is capable of quantitatively measuring a defect even in cases of a small-diameter magnetic member and a thick magnetic member.

A defect measuring device in accordance with an aspect of the present invention may be arranged such that the magnetic sensor is configured to be located in a position on the magnetic circuit, the position being a position in which the density of magnetic flux increases as the depth of the defect of the magnetic member increases.

At the above-mentioned position of the magnetic circuit, the magnetic flux density changes more greatly in response to changes in the depth of the defect of the magnetic member than those at other positions. Therefore, detecting the magnetic flux density at this position with use of the magnetic sensor makes it possible to suitably measure the depth of the detect.

A defect measuring device in accordance with an aspect of the present invention may be arranged such that the inspection probe is substantially in the form of a cylinder and is configured to be inserted into the magnetic member; the yoke includes a small-diameter part and a large-diameter part, the small-diameter part having the first counter surface which is arranged to be substantially parallel to an interior surface of the magnetic member, the large-diameter part having the second counter surface which is arranged to be substantially parallel to the interior surface; and the small-diameter part and the large-diameter part are connected to each other along an axial direction of the magnetic member.

According to the above configuration, the yoke includes the large-diameter part, and therefore the space between the interior surface of the magnetic member and the second counter surface of the large-diameter part, which face each other with the magnetic sensor interposed between them, is relatively small. Thus, the configuration makes it possible to obtain a magnetic flux density that is necessary to measure a defect by the Magnetic Flux Resistance, without having to change the size of the magnet.

A defect measuring device in accordance with an aspect of the present invention may be arranged such that a length of the large-diameter part in the axial direction is not less than 0.25 times an outer diameter of the magnetic member.

With the configuration in which the large-diameter part has a length equal to or greater than the above-indicated value, magnetic flux which increases in magnetic flux density as the depth of the defect of the magnetic member increases is more easily generated in the magnetic circuit.

A defect measuring device in accordance with an aspect of the present invention may be arranged such that an outer diameter of the large-diameter part is not less than 0.51 times an outer diameter of the magnetic member.

With the configuration in which the outer diameter of the large-diameter part is equal to or greater than the above-indicated value, magnetic flux which increases in magnetic flux density as the depth of the defect of the magnetic member increases is more easily generated in the magnetic circuit.

A defect measuring device in accordance with an aspect of the present invention may be arranged such that the magnetic sensor is located within a distance of not more than 5.5 mm from an end of the magnet.

With the configuration in which the magnetic sensor is located within the above-indicated distance from the end of the magnet, it is possible to suitably detect, with the magnetic sensor, the magnetic flux density which increases as the depth of the defect of the magnetic member increases.

A defect measuring method in accordance with an aspect of the present invention is a method of measuring a defect of a magnetic member so as to inspect the defect, including inspecting the defect of the magnetic member with use of any of the foregoing defect measuring devices.

The above method makes it possible to achieve a defect measuring method that is capable of quantitatively measuring a defect even in cases of a small-diameter magnetic member and a thick magnetic member.

An inspection probe in accordance with an aspect of the present invention is an inspection probe configured to inspect a defect of a magnetic member, the inspection probe including: a magnet; a yoke configured to be located on the opposite side of the magnet from the magnetic member; and a magnetic sensor which is configured to be located between the yoke and the magnetic member and which is configured to detect a density of magnetic flux flowing in a magnetic circuit, the magnetic circuit being formed by the magnet, the yoke, and the magnetic member, the yoke having a first counter surface and a second counter surface, the first counter surface being arranged to face the magnetic member with the magnet interposed between the first counter surface and the magnetic member, the second counter surface being arranged to face the magnetic member with the magnetic sensor interposed between the second counter surface and the magnetic member, the second counter surface being arranged to be located closer to the magnetic member than the first counter surface is to the magnetic member.

The above configuration makes it possible to achieve an inspection probe that is capable of quantitatively measuring a defect even in cases of a small-diameter magnetic member and a thick magnetic member.

REFERENCE SIGNS LIST

1 yoke
2 magnet
2a end face (end)
3 Hall element (magnetic sensor)
11 small-diameter yoke (yoke, small-diameter part)
11a first outer circumferential surface (first counter surface)
12 large-diameter yoke (yoke, large-diameter part)
12a second outer circumferential surface (second counter surface)
25 thinning depth calculating section (calculating section)
100, 101, 102 inspection probe
200 thinning measuring device (defect measuring device)
P, P1, P2 magnetic pipe (magnetic member)

The invention claimed is:

1. A defect measuring device for measuring a defect of a magnetic member so as to inspect the defect, the defect measuring device comprising:
   an inspection probe including
      a magnet,
      a yoke configured to be located on an opposite side of the magnet from the magnetic member, and
      a magnetic sensor which is configured to be located between the yoke and the magnetic member and which is configured to detect a density of magnetic flux flowing in a magnetic circuit, the magnetic circuit being formed by the magnet, the yoke, and the magnetic member; and
   a calculating section configured to calculate a depth of the defect of the magnetic member based on an output from the magnetic sensor,
   the yoke having a first outer circumferential surface and a second outer circumferential surface, the first outer circumferential surface being arranged to face the magnetic member with the magnet interposed between the first outer circumferential surface and the magnetic member, the second outer circumferential surface being arranged to face the magnetic member with the magnetic sensor interposed between the second outer circumferential surface and the magnetic member,
   the second outer circumferential surface being arranged to be located closer to the magnetic member than the first outer circumferential surface is to the magnetic member,
   wherein a stepped portion of the yoke separates the first outer circumferential surface from the second outer circumferential surface, and the first outer circumferential surface is positioned lower than the stepped portion, and the second outer circumferential surface is positioned higher than the stepped portion,
   the inspection probe is configured to be inserted into the magnetic member, the magnetic member having a substantially cylindrical shape, and
   a length of the second outer circumferential surface in an axial direction of the magnetic member is longer than a length of the magnetic sensor in the axial direction.

2. The defect measuring device as set forth in claim 1, wherein the magnetic sensor is configured to be located in a position on the magnetic circuit, the position being a position in which the density of magnetic flux increases as the depth of the defect of the magnetic member increases.

3. The defect measuring device as set forth in claim 1, wherein:
the yoke includes a small-diameter part and a large-diameter part, the small-diameter part having the first outer circumferential surface which is arranged to be substantially parallel to an interior surface of the magnetic member, the large-diameter part having the second outer circumferential surface which is arranged to be substantially parallel to the interior surface; and
the small-diameter part and the large-diameter part are connected to each other along the axial direction.

4. The defect measuring device as set forth in claim 3, wherein a length of the large-diameter part in the axial direction is not less than 0.25 times an outer diameter of the magnetic member.

5. The defect measuring device as set forth in claim 3, wherein an outer diameter of the large-diameter part is not less than 0.51 times an outer diameter of the magnetic member.

6. The defect measuring device as set forth in claim 1, wherein the magnetic sensor is located within a distance of not more than 5.5 mm from an end of the magnet.

7. A method of measuring a defect of a magnetic member so as to inspect the defect, comprising inspecting the defect of the magnetic member with use of a defect measuring device recited in claim 1.

8. An inspection probe configured to inspect a defect of a magnetic member, the inspection probe comprising:
a magnet;
a yoke configured to be located on an opposite side of the magnet from the magnetic member; and
a magnetic sensor which is configured to be located between the yoke and the magnetic member and which is configured to detect a density of magnetic flux flowing in a magnetic circuit, the magnetic circuit being formed by the magnet, the yoke, and the magnetic member, the yoke having a first outer circumferential surface and a second outer circumferential surface, the first outer circumferential surface being arranged to face the magnetic member with the magnet interposed between the first outer circumferential surface and the magnetic member, the second outer circumferential surface being arranged to face the magnetic member with the magnetic sensor interposed between the second outer circumferential surface and the magnetic member, the second outer circumferential surface being arranged to be located closer to the magnetic member than the first outer circumferential surface is to the magnetic member, wherein a stepped portion of the yoke separates the first outer circumferential surface from the second outer circumferential surface, and the first outer circumferential surface is positioned lower than the stepped portion, and the second outer circumferential surface is positioned higher than the stepped portion, the inspection probe is configured to be inserted into the magnetic member, the magnetic member having a substantially cylindrical shape, and a length of the second outer circumferential surface in an axial direction of the magnetic member is longer than a length of the magnetic sensor in the axial direction.

* * * * *